United States Patent [19]

Rottenkolber

[11] 4,225,238
[45] Sep. 30, 1980

[54] TIRE CHECKING DEVICE

[75] Inventor: Hans Rottenkolber, Amerang, Fed. Rep. of Germany

[73] Assignee: Opto Produkte AG, Zürich, Switzerland

[21] Appl. No.: 904,757

[22] Filed: May 11, 1978

[30] Foreign Application Priority Data

May 11, 1977 [DE] Fed. Rep. of Germany ....... 2721215

[51] Int. Cl.³ .................. G01B 9/021; G01M 17/02
[52] U.S. Cl. ..................................... 356/348; 73/146
[58] Field of Search .................. 356/347, 348; 73/146

[56] References Cited

U.S. PATENT DOCUMENTS

| 3,698,233 | 10/1972 | Braden et al. | 73/146 |
| 3,976,380 | 8/1976 | Rottenkolber et al. | 356/348 |
| 3,982,835 | 9/1976 | Schwomma | 356/348 |
| 4,116,055 | 9/1978 | Kogler et al. | 73/146 |

FOREIGN PATENT DOCUMENTS 2641516  3/1978  Fed. Rep. of Germany ........... 356/348

Primary Examiner—John K. Corbin
Assistant Examiner—Scott J. Sugarman
Attorney, Agent, or Firm—Becker & Becker, Inc.

[57] ABSTRACT

A checking device for tires of land and air vehicles which includes a coherent light source, a photo shutter as well as an optical circuit which divides a beam emitted by the light source into an object beam and into a reference beam, and which deflects these beams. The device comprises a conical mirror coaxial with the tire to be checked and located in the path of the object beam. A registering layer is located in the beam cone of the object beam reflected in a diffuse manner by the tire surface to be checked through the intervention of the conical mirror. In the beam path of the reference beam there is located a registering layer which is adapted to be observed by means of an observing system. Means are provided for subjecting the tire to be checked to a pressure drop relative to the atmosphere surrounding the tire to be checked. The conical mirror is by means of a platform arranged on a removable holding device at a height more than twice the height of a tire to be checked when the latter occupies its lying position while the holding device embraces the tire to be checked. The holding device for the conical mirror is movably connected to a hood which surrounds the last mentioned holding device and extends over the platform while forming an air-tight closing member adapted to be evacuated and to be lifted and lowered. The tires to be checked are arranged on devices adapted to be placed upon the platform coaxially about the conical mirror for observing the inner side of the tire tread surface and are arranged coaxially below the conical mirror for observing the bead and lateral wall surfaces.

9 Claims, 5 Drawing Figures

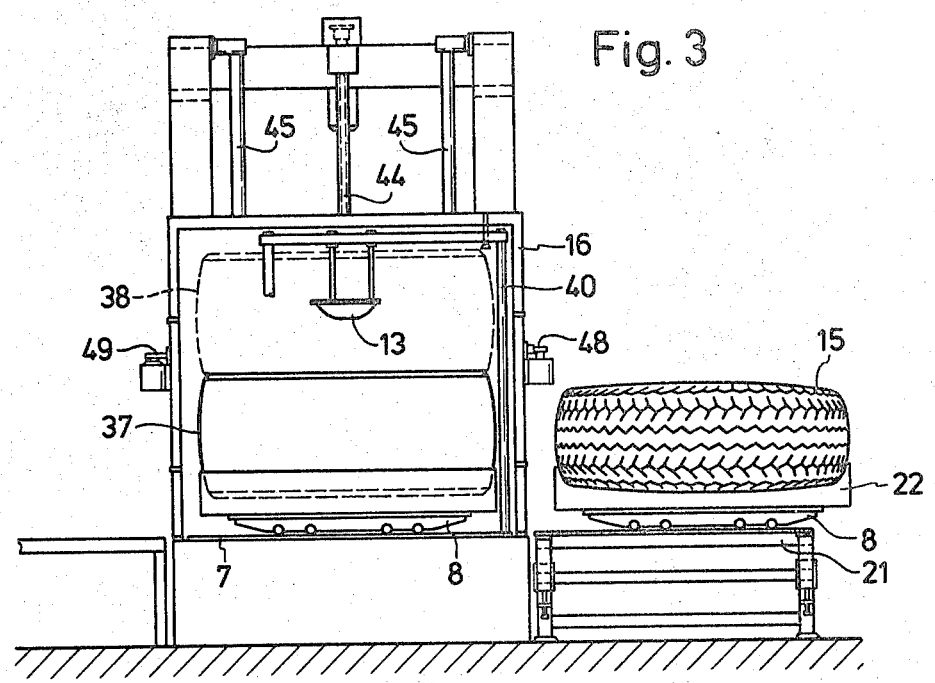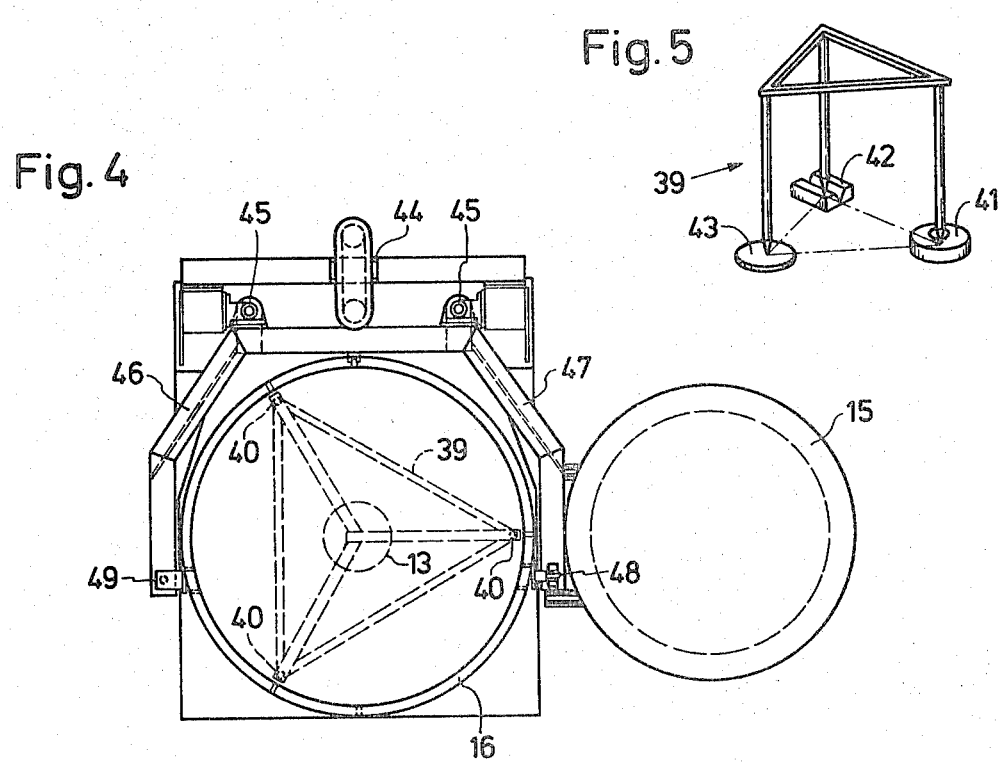

TIRE CHECKING DEVICE

The present invention relates to a tire checking device for checking vehicle and airplane tires concerning flaws in the material which comprises a coherent light source, a photo shutter as well as an optical circuit which divides a beam emitted by the light source into an object beam and into a reference beam and which deviates these beams. The device also comprises a conical mirror which is coaxial with the tire to be checked and is located in the path of the object beam. The device further comprises a registering layer which is located in the beam cone of the object beam reflected in a diffuse manner by the tire surface to be checked through the intervention of the conical mirror. In the beam path of the reference beam, the device furthermore comprises a registering layer and a device for observing said registering layer. There are also provided means by which the tire to be checked can be subjected to a pressure drop relative to the atmosphere surrounding the tire, while the virtual reflection points of the reflected object beams are located on ellipsoids the focal points of which are formed by the virtual light source and the observing point. The object beams are emitted by a virtual light source which is formed by the reflection of the object beam and are reflected by the tire surface.

Devices of the above mentioned type serve the purpose of checking tires, without destroying them, with regard to flaws which, when the atmospheric pressure surrounding the tire drops with regard to the ambient pressure in gas enclosures in its interior or when the pressure increases with regard to the ambient pressure, appear as local elevations on the tire surface which are mostly located only in the $\mu m$ region. These flaws are delaminations of layers of the tire inner structure which are caused by enclosures of gas, humidity or other foreign matter or are caused by delaminations of the tire reinforcements. The surface displacements which occur in view of the expansion of the tire during the generated pressure changes produce interference figures in the registering layer during the superimposition of the holograms of the original condition of the tire and of the condition of the tire after the pressure change. With a holographic arrangement as it has been disclosed in U.S. Pat. No. 3,986,380, the interference lines are suppressed which originate from the regular expansion of the tire so that only those interference lines become visible which originate from bulging caused by gas bubbles at the mentioned flaw areas and which generally appear as concentric circles or ellipses. The above mentioned publication, however, does not disclose details suitable for a checking of tires in series.

German Offenlegungsschrift No. 2 641 516 (German Patent application P 2641516.7) discloses a tire checking device by means of which the inner surfaces of vehicle and airplane tires in series can be observed and checked as to flaws in short processing cycles. This permits a checking of the entire range of the thread surfaces and of the adjacent tire shoulders, but does not permit the checking of the lateral or side surfaces and of the bend zones of the respective tire which side surfaces and bead zones likewise are regions of considerable danger if flaws should be present.

It is, therefore, an object of the present invention to provide a tire checking device which will make it possible by steps in series to observe in short cycles all regions of the tire including the bead zones while such a device will be able to withstand rough industrial usage.

It is a further object of this invention to provide a device as set forth in the preceding paragraph in which by coordinating the individual picture points with the tire surface, it will be possible immediately to locate the flaws in the tire which are ascertained in the interference hologram.

These and other objects and advatages of the invention will appear more clearly from the following specification in connection with the accompanying drawings, in which:

FIG. 3 is an axial section through another embodiment of the tire checking device of FIG. 1 taken in a plane corresponding to the plane I—I of FIG. 2.

FIG. 4 is a top view of the device shown in FIG. 3.

Figure 1:
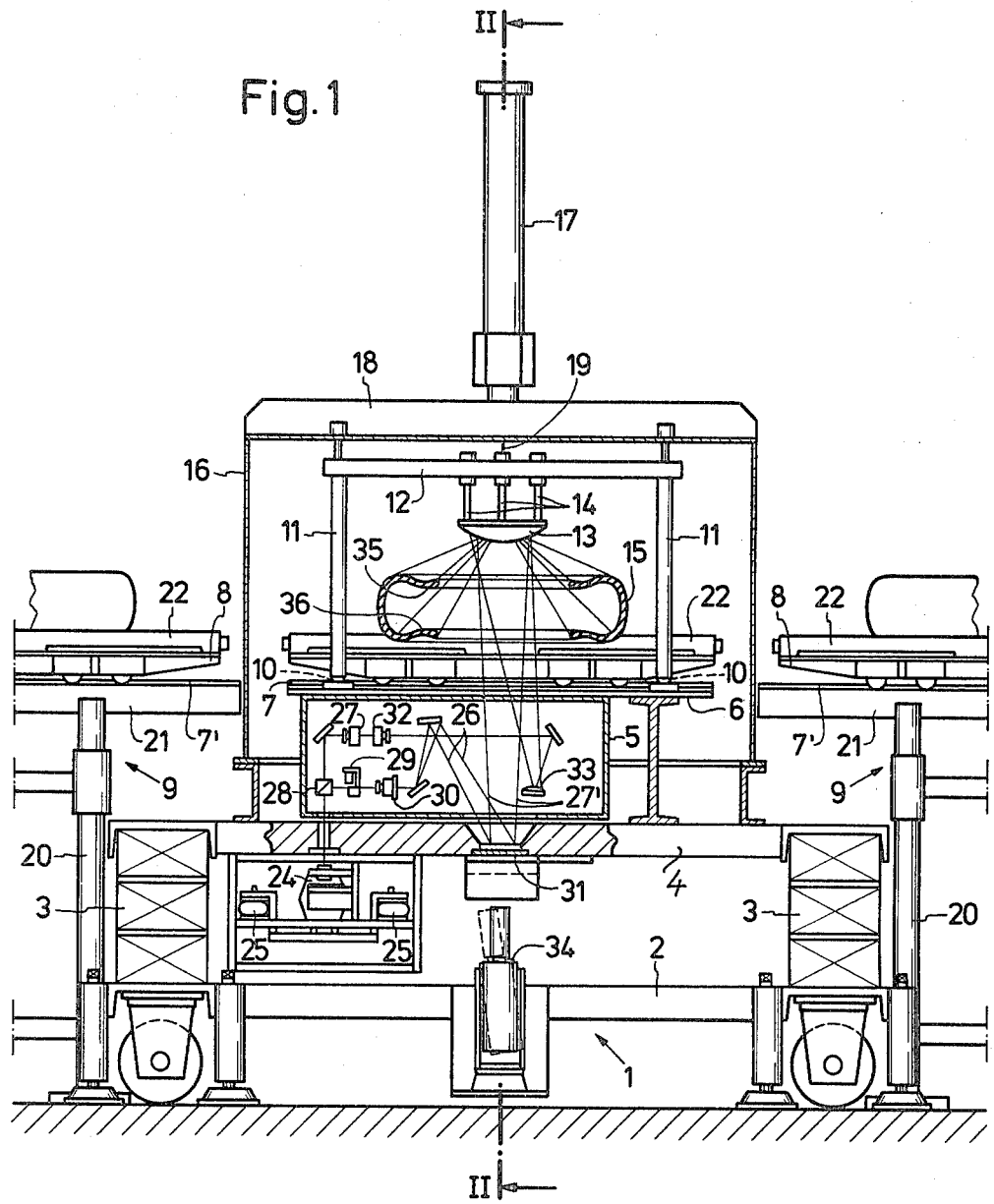
FIG. 1 represents an axial section through the tire checking device according to the invention, said section being taken along the line of the tire movement in the plane I—I of FIG. 2.

FIG. 5 diagrammatically illustrates the holding means for the conical mirror in a device according to FIG. 3.

The device according to the present invention is characterized primarily in that the conical mirror is arranged on holding means by means of a platform at a level higher than twice the height of the tire to be checked. The holding means for the conical mirror is movably connected to a hood which surrounds the holding means and extends over the platform while being adapted to be closed off in an air-tight manner and to be evacuated. The hood is adapted by means of a lifting device to be lifted and lowered while taking along the holding means for the conical mirror. The lower ends of the foot portions of the holding means are pointed in a conical manner and during the lowering of the holding means engage depressions in the surface of the platform.

The tires to be checked are arranged on devices adapted to be placed upon the platform for observing the inner side of the tire tread surface. More specifically, the tires to be checked are arranged coaxially about the conical mirror and, for observing the bead and side surface areas of the tire, are located coaxially below the conical mirror.

The devices adapted to be placed upon the platform may consist of carriages in which can be arranged high cradles for mounting the tires for observing the inner side of the tread surface and low cradles for observing the bead and side surface areas of the tire. The carriages may move on rails which are arranged on the path of conveyors at both sides of the platform at the height thereof and subsequent thereto on the platform itself.

The holding means for the conical mirror may have three foot portions with conically pointed ends of which one end engages a funnel-shaped depression while another foot end portion engages a groove-shaped recess directed toward the depression, and the third foot portion end engages a plate, the funnel-shaped depression, the groove-shaped recess and the plate being located on the surface of the platform.

The registering layer may be formed by a thermoplastic film which is adapted by an electrostatic charge to be sensitized and to be developed by heating. Below the registering layer there may be provided a television camera for observing the holograms generated in the registering layer. The television camera is inclined at an acute angle with regard to the optical axis of the device and is rotatable about this axis. The television camera may, however, if desired also be arranged stationarily while in front of the television camera a rotatable flat prism is provided.

On the turning axle of the television camera and of the prism there may be provided a rheostat engaging (anlaufend) the axle, and means may be provided in order that its resistance value, after an analogous digital conversion, may be introduced digitally into the monitor connected to the television camera in conformity with a gradation of the tire support. On the screen of the monitor there may be provided an exchangeable horizontally displaceable template with vertical gradation corresponding to the tire profile to be checked.

Referring now to the drawings in detail, the base 1 of the tire checking device illustrated in the drawings comprises a heavy horizontal base plate 2 which rests on legs. Arranged above the base plate 2, on shock absorbers 3, is arranged a second heavy horizontal plate 4 which serves as support for the device proper. This support carries a housing 5 which contains the optical control elements. Above the housing 5 there is a platform 6 with rails 7 for a carriage 8 of the tire conveying arrangement 9. Outside of the space provided for the tire to be checked, the platform 6 comprises four funnel-shaped recesses 10 engaged by conical ends of the legs 11 of the holding means 12 for a conical mirror 13. The conical mirror 13 is, coaxial with the tire 15 to be checked, connected to the holding means 12 by means of an adjustable linkage system 14.

Figure 2:
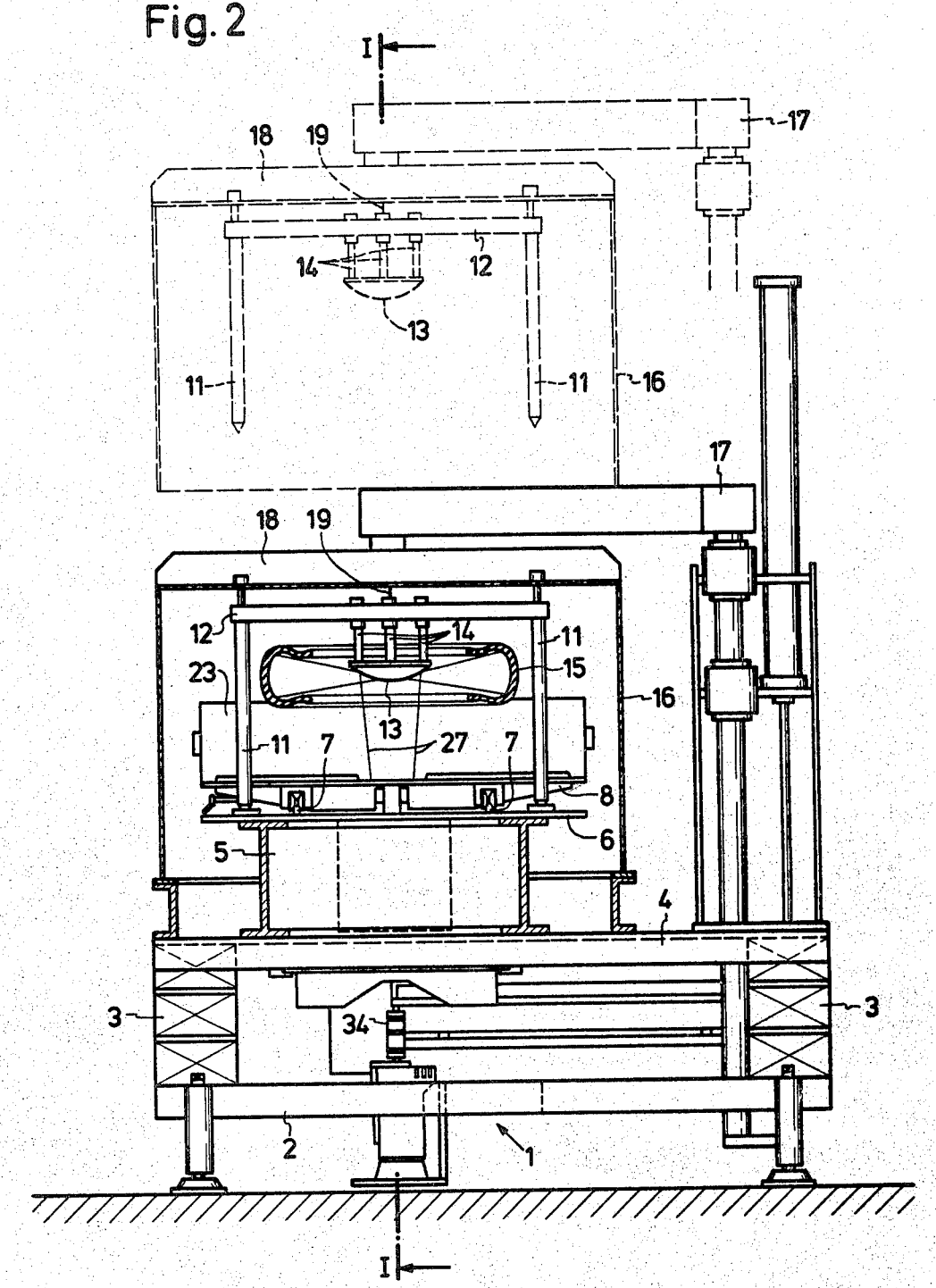
FIG. 2 represents an axial section through the checking device of FIG. 1, said section being taken along the line II—II of FIG. 1.

A cylindrical hood 16 extends around the entire arrangement of platform 6, carriage 8, tire 15 to be checked, and the conical mirror 13 as well as its suspension 11, 12, 14. The hood 16 rests upon an annular mount on plate 4 and together with the same surrounds a chamber adapted to be evacuated. The hood 16 can be put on and can be taken off by means of a hydraulic lifting device 17 so as to permit the transport of the tire 15 to be checked onto the carriage 8. The hood 16 is adapted to be evacuated for carrying out the checking of the tire. The holding means 12 for the conical mirror 13 is movable on the upper portion 18 of the hood and with play is at a vertical distance thereto connected, for instance, by means of a cable 19. When the hood 16 is lifted, also the holding means 12 with its legs 11 and the conical mirror 13 screwed thereto are taken along as shown in FIG. 2 by a dash line so that the carriages 8 can be moved in and out. When the hood 16 is lowered after the tire 15 to be checked has been moved in, the conical ends of the legs 11 extend into the funnel-shaped recesses 10 whereby the conical mirror 13 is fixed in the axis of the optical arrangement of the device.

The transport of the tire 15 to be checked is effected on a conveyor 21 which is provided with rails 7' and is arranged at the level of the platform 6. The tires 15 to be checked rest on the carriages 8 in cradles 22, 23 on filling of sand or steel wool. Depending on the desired observation of either the inner surface of the tire or of the bead zones of the tire, the cradles have a smaller or greater height. With the cradle 23 illustrated in FIG. 2, the mirror 23 is, after closing of the hood 16, located in the interior of the tire 15 to be checked. This position of the conical mirror makes possible an observation of the interior of the tire as has been described in detail in German Offenlegungsschrift No. 2 641 516. On the other hand, with the cradles 22 illustrated in FIG. 1, the tire 15 to be checked is located below the conical mirror 13. This arrangement makes possible an observation of the bead zones of the tire as will be described further below.

Below the plate 4 there is suspended on shock absorbers 25 a laser 24 as coherent light source. The light beam emitted by the laser passes through openings in plate 4 and in housing 5 and enters the latter where, by means of a divider cube 28 (Teilerwurfel) it is split up into the reference beam 26 and the object beam 27. After passing through the photo shutter 29, the reference beam is broadened in a spreading optic 30 and by deflecting mirrors is deflected onto the registering layer 31 which is a thermoplastic film. The object beam is, after deflection and broadening, in a spreader optic 32 deflected onto a convex mirror 33 by means of which, through the conical mirror 13, it is reflected upon the inner surface of the tire 15 to be checked. The object beam 27' which by means of the surface is in a diffuse manner reflected back onto the conical mirror 13, is by the mirror 13 directed onto the registering layer 31 on which, together with the reference beam 26, it creates a hologram. This hologram is observed by the television camera 34 and its picture can then by the camera be conveyed to a non-illustrated monitor. In this connection, the convex mirror 32 is arranged outside of the beam cone of the diffusely reflected object beam 27', which beam cone is reflected by the conical mirror.

The observation of the inner tire surface and the checking of the tire as to flaws in its tread area and the adjacent flank regions is described in detail in the above mentioned German Offenlegungsschrift No. 2 641 516. The obtained effect of suppressing deformations of the tire during the changes in the pressure potential relative to its surroundings, which do not substantially develop in the direction of the object beam entering the tire, is shown in FIG. 2 of the above mentioned German Offenlegungsschrift. The same optical arrangement is employed in the device described herein, and the same effect is obtained when this device is employed.

When the bead regions and the adjacent lateral surface regions of the tire 15 to be checked are to be investigated, the tire is, while using the smaller vat 22, concentrically arranged with regard to and below the conical mirror 13. The object beam 27 is then without change in the optical arrangement hitting the outside surface of the upper tire bead 35 and the adjacent lateral surface of the tire 15 as well as the inner surface of the lower tire bead 16 and the adjacent lateral surface region of the tire. The formation of the interference hologram and the suppression of the interference figures formed by the uniform expansion of the tire are in this instance the same as obtained when observing the inner surface of the tread area of the tire to be checked.

The registering layer 31 is preferably a thermoplastic film sensitized by an electrostatic charge. In this film, by exposing it to the object beam and the reference beam light and by subsequent heating and cooling of the film, a hologram of the observed tire surfaces can be created.

Below the registering layer 31 there is arranged a television camera 34 for observing the hologram. This television camera is connected to a non-illustrated monitor. In order to make the picture taken by the television camera visible section by section and subsequently as enlarged picture in the monitor, the television camera 34 is arranged so as to be inclined to the optical axis of the object beam 27' hitting the registering layer 31, and the television camera 34 is rotatable about the optical axis. According to this modification, instead of the just described arrangement, a rotatable flat prism may be provided in front of the stationarily arranged television camera.

The tires to be checked are brought in on the carriages 6 on the conveyor path where they have time to return to their original shape after being subjected to deformations during the loading operation so that, during the checking operation proper, no movements in the tire interfering with the checking picture will occur. For the same reason, the tires in the cradles 22, 23 rest on sand or steel wool packings which form a uniform support avoiding any creeping movements. The tires are moved into the device to such an extent that they are located concentrically with regard to the optical axis of the mirror 13. Thereupon the hood 16 is lowered, and the first exposure to light of the thermoplastic film is effected at 31 which film had been sensitized in the meantime. After reducing the pressure in the chamber surrounded by the hood 16, the film is exposed a second time to light. Thereupon the film is developed by heating and can be observed by the television camera. In the film, a phase hologram is produced which represents an annular picture of the tire, i.e. either of the inner side of the tread surface area or of the bead and lateral surface areas of the tire. The television camera 34 senses this annular picture while turning so that the picture will appear as development in the monitor.

With this observation by the television camera, the object beam is faded out and the reference beam which, with regard to the object beam during the picture taking, had its intensity reduced by a filter, is taken full advantage of for exposing the hologram to light.

For observing the inner surface of the tread area of the tire 15 to be checked, as shown in FIG. 2, a larger cradle 23 is used so that the conical mirror 13, when closing the hood, will be located in the interior of the tire, and the object beam 27 is by the conical mirror 13 reflected uniformly upon the inner surface of the tread region of the tire 15 to be checked. For observing the bead zones and the lateral wall areas of the tire 15 to be checked, the tire is placed on the smaller or lower cradle 22. Consequently, the conical mirror 13 is, when closing the hood 16, located above the tire, and the reflected beam cone of the object beam 27 hits at an incline from above the bead as well as the lateral wall regions of the tire. The here diffusely reflected radiation 27' which substantially is reflected at the same angle upon the conical mirror 13, will in the registering layer 31 generate the superimposition hologram. The optical circuit of the device will with this observation of the bead and side wall regions of the tire 15 remain completely unchanged with regard to the observation of its tread surface region with the exception of the level of the tire 15 to be checked. A particular advantage of the invention is seen in the fact that for changing over from one observation method to the other, it is merely necessary to exchange a cradle 22 for another cradle 23. This can be done without difficulty during one circulation of the tires which anyhow need a longer time for the above described rest period. Thus, it is merely necessary to send one and the same tire twice through the completely unchanged checking device for checking the tire completely and on all sides. Furthermore, the observation of the tire at the angles at which the light beams hit the bead and the lateral surface regions and at which the object beams are reflected will suffice for obtaining a complete picture of the checked tire zone which picture can be judged very satisfactorily, while the interference figures resulting from the normal tire expansion will be suppressed and only slight distortions occur in radial direction in the picture.

During the observation of the obtained hologram by the television camera 34, the rotational speed of which is adapted to the observing ability of the human eye, the manipulations are carried out which are necessary for the exchange of the tire to be checked, namely the hood 16 is lifted, the tire 15 is moved out, and the new tire to be checked following the just checked tire is moved in, and the hood 16 is lowered again. In the meantime, the observation of the hologram of the moved out tire is completed so that a new film section can be pulled into the position at 31 while being sensitized. Thereupon the next first light exposure can be effected. To this end, the object beam is again faded in, and the reference beam is again reduced in its intensity.

For correlating the flaws appearing in the monitor to the tire 15 to be checked, the tire support is provided with a gradation. The position of the television camera 34 is correlated to this gradation. The position of the television camera 34 is correlated to this gradation, while being digitally introduced into the monitor so that on the gradation the radial position of the areas of the respective flaws can be read. The level of the place of the flaw can be ascertained by providing an exchangeable template with zone gradation, which template is horizontally displaceable above the monitor picture and is adapted to the respective type of tire to be checked. The position of the camera or of the rotatable prism can be measured by a rheostat engaging the turning axle of the camera. The respective value obtained by the rotation of the axle is in an analogous digital converter converted into the digital value introduced into the monitor.

A further embodiment of the tire checking device according to the invention is illustrated in FIGS. 3 and 4 according to which the encapsuled optical system, which is identical to the system described in connection with the device of FIGS. 1 and 2, is no longer shown. The tire 15 to be checked rests on a cradle 22 and on the carriage 8 in front of the device. In the device, the tire to be checked is indicated in the two positions for observation at 37 and 38, at 38 on a carriage 8 with a high cradle 23.

The conical mirror 13 is arranged on holding means 39 by means of three legs 40 which are again movably suspended on the top side of the hood 16. The holding means 39 is diagrammatically shown in FIG. 5. To obtain a statically defined suspension of the conical mirror 13, the points of engagement of the legs 40 with the platform 6 are provided in the conical recess 41, in a groove-shaped recess 42 directed to the recess 41, and on the plate 43.

For lifting and lowering the hood, hydraulic working cylinders 44 are provided the piston rods of which are supported by arms 46, 47 which move on guiding rods 45. The arms 46, 47 are linked to the hood 16 at 48 and 49 respectively.

The particular advantage obtained by the present invention consists in that the checking of the tire can be effected fully automatically. In this connection, at least the opening and closing of the hood 16, the transport and sensitizing of the film, the exposure to light, and the desired stepwise evacuation to a different degree can be brought about by a single switching-on operation. Inasmuch as the observation of the picture of the tire surfaces on the monitor can be effected at the time of manipulating the tire and the hood, very short cycles are obtained per each tire being checked.

Inasmuch as the device and in particular the laser are mounted in a shock absorbing manner, and since the device itself is of heavy construction, it is possible to carry out a continuous industrial operation which can be synchronized with the tire production.

It is, of course, to be understood that the present invention is by no means limited to the particular showing in the drawings but also encompasses any modifications within the scope of the appended claims.

Thus, for instance, it is within the framework of the present invention when the guiding of the reference beam and of the object beam is effected in the manner described in German Offenlegungsschrift No. 26 15 081, in other words when the object beam and the reference beam are passed through the center of the conical monitor 13 and coaxially thereto, and when the object beam is by means of an annular coaxial mirror reflected onto the conical mirror.

What I claim is:

1. A holographic checking device for observing both bead zones as well as inner wall surfaces of tires of land and air vehicles free of any destruction thereof using the same optical arrangement with two different adjustments thereof which includes a coherent light source, a photo shutter, as well as an optical circuit dividing a beam emitted by the light source into an object beam and into a reference beam and which deflects these beams by an optic circuit, and which also includes a conical mirror coaxial with the tire to be checked and located in the path of said object beam coinciding therewith while a registering layer is located in the beam cone of the object beam reflected in a diffused manner by the tire surface to be checked through the intervention of said conical mirror, said device also including an observing system adapted to observe said registering layer, means for subjecting the tire to be checked to a pressure drop relative to the atmosphere surrounding the tire to be checked, means for changing height position of the tire relative to said conical mirror including a removable holding device and a hood as well as a platform arranging said conical mirror on said removable holding device at a height differing from the height of the tire to be checked when the latter occupies its lying position while said holding device embraces the tire to be checked, said holding device for the conical mirror being movably connected to said hood which surrounds the last mentioned holding device and extends over the platform while forming an airtight closing member adapted to be evacuated and to be lifted and lowered, the tires to be checked being arranged on devices adapted to be placed upon the platform coaxially about the conical mirror for observing the inner side of the tire tread surface and being arranged coaxially below said conical mirror for observing both the bead zones and inner wall surfaces at differing heights.

2. A device according to claim 1, in which the devices adapted to be placed upon the platform include carriages with relatively deep vats for receiving the tires to be checked for observing the inner side of the tire tread, and also includes relatively shallow vats for observing the bead and lateral surface areas of the tires to be checked.

3. A device according to claim 2, which includes rails for guiding said carriages, said rails being arranged on conveyor paths on both sides of said platform at the level thereof and subsequently on said platform itself.

4. A device according to claim 1, in which the holding means for the conical mirror comprises three legs with conically tapered ends of which one leg is arranged in a funnel-shaped recess while another leg is arranged in a groove-shaped recess aligned with said first mentioned recess, and in which said third leg is arranged on a plate located on the surface of the platform.

5. A device according to claim 1, in which said registering layer is a thermoplastic film adapted to be synthesized by an electrostatic charge and also adapted to be developed by heat.

6. A device according to claim 1, in which below said registering layer there is provided a television camera for observing the holograms created in said registering layer, said camera being inclined at an acute angle to the optical axis of said device and being rotatable about said axis.

7. A device according to claim 6, in which said television camera is stationary and a rotatable flat prism is arranged in front of said camera.

8. A device according to claim 7, in which along the axis of said television camera and the axis of said prism there is provided an engaging rotatable resistor, and which includes means for entering the resistance value of said resistor in conformity to an analogous digital conversion into the monitor in conformity with a graduation of the support of the tire to be checked, said monitor being connected to said television camera.

9. A device according to claim 8, which includes a template with vertical graduation which template is horizontally displaceable and corresponds to the profile of the tire to be checked, said template being arranged on the picture screen of said monitor.

* * * * *